April 16, 1957  C. N. ARNOLD  2,788,833
EXPANDING TOOL
Filed July 30, 1953

Charles N. Arnold
INVENTOR.

BY *Clarence A. O'Brien*
*and Harvey B. Jackson*
Attorneys

United States Patent Office 2,788,833
Patented Apr. 16, 1957.

2,788,833
EXPANDING TOOL

Charles N. Arnold, Salinas, Calif.

Application July 30, 1953, Serial No. 371,317

1 Claim. (Cl. 153—82)

This invention relates to an expanding tool for tubes or hose couplings and more particularly to a device for expanding grooves in tubes, hose coupling nipples, and the like.

An object of this invention is to provide an expanding tool which is simple in operation and is easily inserted in or removed from a tube or coupling.

Another object of the invention is to provide a relatively small and light-weight expanding tool that is sturdy in construction and durable and lasting in operation.

These together with various ancillary features and objects of the invention which will later become apparent as the following description proceeds, are attained by the present invention, a preferred embodiment of which has been illustrated by way of example only, in the accompanying drawings wherein.

Figure 1:
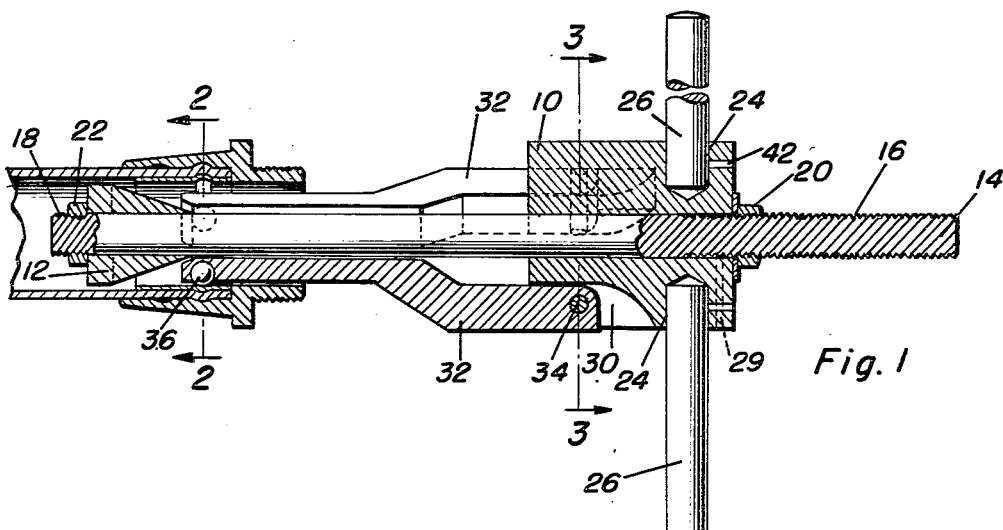
Figure 1 is a sectional view of a preferred form of the present invention, showing the tool in an operative position within a hose coupling.
Figure 2:
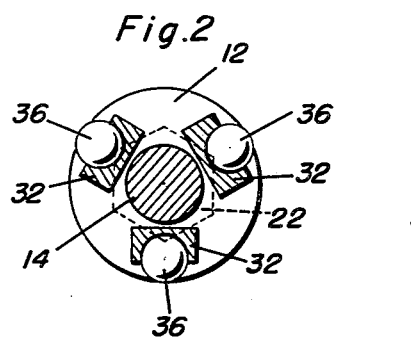
Figure 2 is a sectional view taken substantially along the section line 2—2 of Figure 1.
Figure 3:
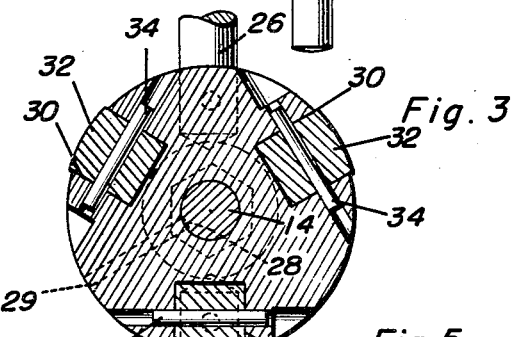
Figure 3 is a sectional view taken substantially along the section line 3—3 of Figure 1.
Figure 4:
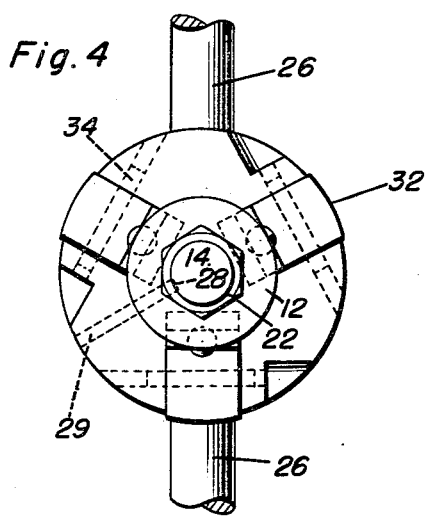
Figure 4 is an end view of the preferred form of the invention, as seen from the left of the tool shown in Figure 1.

Referring now more specifically to the accompanying drawings, wherein like numerals designate similar parts throughout the various views, it will be seen that the improved expanding tool forming the subject of the invention includes, as shown in Figure 1, a cylindrical head member 10, and a conical shaped wedge member 12 slidably mounted upon a shaft or rod 14.

The shaft 14 is provided with threaded portions 16 and 18 at each end thereof, which threaded portions are adapted to receive nuts 20 and 22 respectively. The purpose of the nuts and threaded portions is to retain the head member 10 and the wedge member 12 on the shaft 14. The nut 20 limits the movement of the head member toward the threaded end 16 of shaft 14. The nut 22 limits the movement of the wedge member 12 toward the threaded end 18 of the shaft 14. Thus means are provided for adjusting the position of the head member and the wedge member relative to one another.

The head member 10 is provided with a pair of bores 24 in opposite sides thereof into which handles 26 are inserted. These handles are provided for imparting rotary movement to the assembly for reasons which will later become apparent.

The shaft 14 is provided with a slot 28 along one side thereof and extending the length of the threaded portion 16. The head 10 is provided with a bore 29 which extends from one side of the head to the central opening which fits over the shaft. The purpose of this bore is to mount a pin which will extend into the slot 28 in the shaft and form therewith a spline connection preventing rotation of the head with respect to the shaft, but which will at the same time, allow the head to slide axially along the shaft. Thus when rotary motion is imparted to the head 10 the shaft 14 will likewise be turned.

Figures 5, 6:
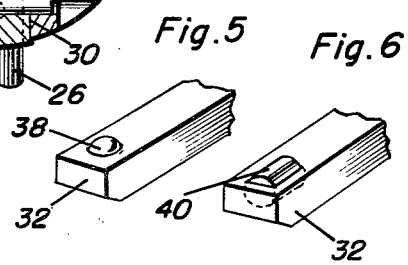
Figure 5 is a view of an end portion of an expansion arm showing a solid projection thereon.
Figure 6 is a view of an end portion of one of the expansion arms showing a roller-type projection mounted thereon.

A plurality of slots 30 are formed in the head member 10 at the end adjacent the wedge member 12. An arm 32 is pivotally mounted in each of the slots 30 by means of a pin 34. The arms 32 are offset at an angle so as to parallel the shaft 14. The free end of each of the arms 32 is provided with an outwardly extending projection. This projection may comprise a steel ball recessed in the end of the arm as shown in Figure 1 and indicated by the numeral 36, or it may be a solid projection as shown at 38 in Figure 5, or it can be a roller embedded in the end of the arm as shown at 40 in Figure 6.

The wedging member is formed with its wedging surface sloping toward the head member. The ends of the arms 32 are beveled at their inner edge so as to freely ride upon the wedging surface. Thus when the wedge member 12 is drawn toward the head member 10, the arms 32 will be spread apart by the wedging member 12.

With regard to handles 26 bores 42 may be provided in the head 10 for the reception of set screws which will lock the handles in position. Thus the handles may be easily removed for greater compactness in storing the device.

In operation, the nut 20 is backed away from the head member 10 and said member 10 is moved manually by handles 26 a sufficient distance away from the wedge member 12 so that the free ends of the arms 32 will lie against the shaft 14. Then the tool is inserted in the tube or coupling it is desired to expand. After the tool is inserted in the tube or coupling the nut 20 is fed forwardly on shaft 14 against the head member to draw the wedge member in between the free ends of the arms 32 and spread said ends apart so as to cause the projections on the end of the arms to engage the inside surface of the tube or coupling, and form opposite dents in the tube or coupling. The tool is then rotated and a groove will be formed in the wall of the tube or coupling by the projections. The nut 20 may be further tightened against the head 10 to cause the projections on the ends of the arms to make a deeper groove in the wall. If it is desired to make more than one groove in the wall, the nut is loosened until the projections are withdrawn from the groove and then the tool is moved to the second desired position and the operation is repeated. To withdraw the tool from the tube or coupling, the nut 20 is moved away from the head 10, and the shaft 14 moved forwardly in the head 10 to move the wedge member 12 forwardly clear of the free ends of the arms 32 thus allowing the arms 32 to come in contact with the shaft 14 at which time the tool can easily be removed.

It is to be noted that the wedge member 12 is slidably adjustable on the shaft 14 by turning the nut 22 against the wedge member and whereby to take up wear on the wedge member and on the projections or balls 36.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

A tool for expanding a tube comprising a cylindrical head member, a plurality of tube expanding arms extending from one end of the head member, said arms being pivoted at corresponding ends thereof to said head member for spreading of the other ends thereof apart and against the inside of a tube to expand said tube, a rod extending between said arms and slidably extended through said head member, a conical wedge member on one end of said rod engageable with said other ends of said arms to spread the same apart upon sliding of said rod in one direction, and a nut threaded onto the other end of said rod for screw feed thereon against an end of said head member to slide the rod, a handle attached to said head member, said head member being rotatable by said handle to revolve said other ends of the arms in the tube, said wedge member being slidably adjustable on said rod and relative to said other ends of the arms to take up wear on said wedge member and said other ends of the arms, and a nut threaded on the first named end of said rod for turning against said wedge member to adjust the wedge member.

References Cited in the file of this patent

UNITED STATES PATENTS

| Number | Name | Date |
|---|---|---|
| 212,964 | McGraw | Mar. 4, 1879 |
| 410,282 | Jardine | Sept. 3, 1889 |
| 494,329 | Flint | Mar. 28, 1893 |
| 794,337 | Blevins | July 11, 1905 |
| 1,120,100 | Sonneborn | Dec. 8, 1914 |
| 1,204,148 | Flanagan | Nov. 7, 1916 |
| 1,281,861 | Sibley | Oct. 15, 1918 |
| 1,648,189 | Ottinger | Nov. 8, 1927 |
| 1,670,886 | Fellows | May 22, 1928 |
| 1,717,487 | Armstrong | June 18, 1929 |
| 1,938,194 | Rader | Dec. 5, 1933 |
| 1,942,612 | Naher | Jan. 9, 1934 |
| 2,072,359 | Dobrick | Mar. 2, 1937 |
| 2,155,542 | Graham | Apr. 25, 1939 |
| 2,190,386 | Scholtes | Feb. 13, 1940 |
| 2,529,185 | Proctor | Nov. 7, 1950 |